United States Patent [19]

Jacoby

[11] Patent Number: 4,506,607
[45] Date of Patent: Mar. 26, 1985

[54] SHELF-TYPE DRIVERLESS VEHICLE

[75] Inventor: Charles E. Jacoby, Bethlehem, Pa.

[73] Assignee: SI Handling Systems, Inc., Easton, Pa.

[21] Appl. No.: 141,099

[22] Filed: Apr. 17, 1980

[51] Int. Cl.³ .............................................. A47B 57/00
[52] U.S. Cl. ...................................... 108/60; 211/126; 211/43
[58] Field of Search .................... 108/60, 61; 211/43, 211/71, 184, 126, 153

[56] References Cited

U.S. PATENT DOCUMENTS

| | | | |
|---|---|---|---|
| 2,959,293 | 11/1960 | Von Meyer | 211/43 X |
| 3,132,735 | 5/1964 | Nilsen | 211/126 X |
| 3,233,804 | 2/1966 | Dahm | 211/126 X |
| 3,356,040 | 12/1967 | Fonden | 104/166 |
| 3,523,694 | 8/1970 | Oliver | 211/126 X |
| 3,788,209 | 1/1974 | Artar | 211/153 X |
| 4,162,013 | 7/1979 | Tucker | 211/43 |

FOREIGN PATENT DOCUMENTS 847725  7/1939  France ................................ 211/126

OTHER PUBLICATIONS

SI Handling Systems "Sinews" vol. 3, No. 3, Oct., 1974.

Primary Examiner—Francis K. Zugel
Assistant Examiner—Peter A. Aschenbrenner
Attorney, Agent, or Firm—Seidel, Gonda & Goldhammer

[57] ABSTRACT

A driverless vehicle having a plurality of shelves is provided with at least one trough supported by the shelves and separate therefrom. Each trough is open at the top and is open at each end thereof. A discrete puller member extends between side walls of the trough at each end thereof to facilitate pulling a trough and any merchandise therebetween toward one side of the vehicle to facilitate unloading the vehicle.

8 Claims, 6 Drawing Figures

SHELF-TYPE DRIVERLESS VEHICLE

BACKGROUND

It is known to provide a warehouse in the form of a closed loop conveyor system having pallet-type vehicles containing merchandise. Instead of workers going to the merchandise to fulfill an order, the workers stand in one spot along side the conveyor and remove merchandise from moving vehicles as the vehicles pass along that portion of the conveyor system. Such system has been generally satisfactory wherein the merchandise is in the form of large boxes. Where the merchandise is in the form of smaller packages, access to the rearmost packages is difficult. The present invention is directed to a solution of this problem.

SUMMARY OF THE INVENTION

The present invention is directed to an improvement of a conventional driverless vehicle having support wheels and means on the vehicle for contact with a device for propelling the vehicle. The vehicle as provided with a plurality of shelves which are open on at least one side of the vehicle. In such a conventional vehicle, the improvement is directed to the provision of at least one trough supported by the shelves and separate therefrom. Each trough is open at the top and is open at each end thereof. A discrete puller member extends between the side walls of the trough at each end thereof to facilitate pulling a trough and any merchandise therebetween toward one side of the vehicle to facilitate unloading.

It is an object of the present invention to provide a novel shelf divider and/or lane puller for use on shelves of a driverless vehicle in a manner whereby unloading is facilitated in a simple, inexpensive and reliable manner. Other objects will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
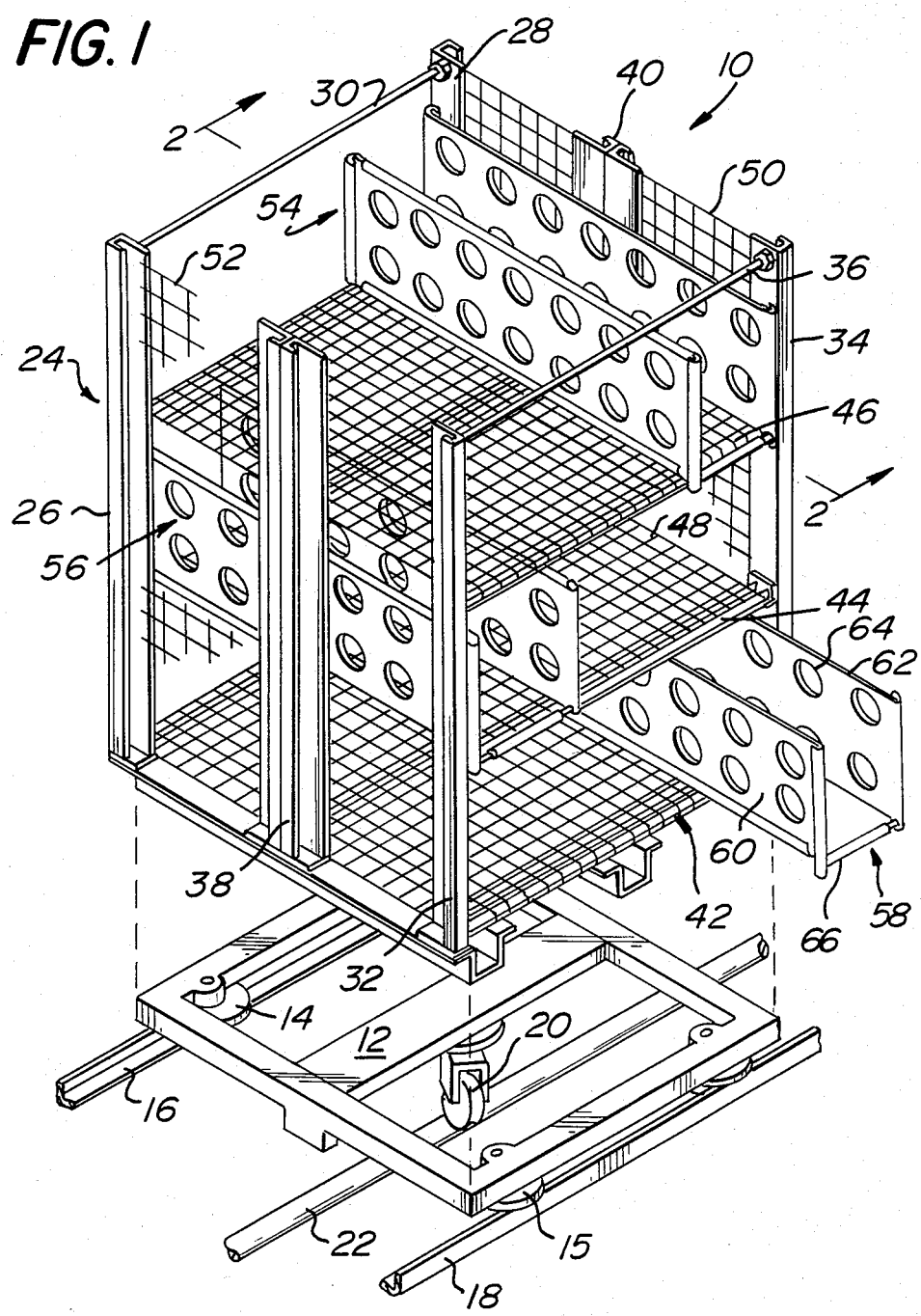
FIG. 1 is an exploded perspective view of a driverless vehicle in accordance with the present invention.

Referring to the drawing in detail, wherein like numerals indicate like elements, there is shown in FIG. 1 a driverless vehicle designated generally as 10. The vehicle 10 includes a base 12 having wheels 14 on one side for riding on track 16 and wheels 15 on the opposite for riding on track 18. The base 12 supports a pivotable drive wheel 20 in contact with a propelling means in the form of a drive tube. The manner in which drive wheel 20 cooperates with drive tube 22 is perse old and need not be described herein. If a more detailed description is desired, see U.S. Pat. No. 3,356,040.

The vehicle 10 includes an upright frame work designated generally as 24. The framework 24 includes vertical members 26 and 28 on one side interconnected in any manner such as rod member 30. The framework 24 also includes upright members 32 and 34 on the opposite side of the vehicle and interconnected by rod members 36. If desired, additional upright members 38 and 40 interconnected by horizontally disposed rod members may be provided.

Rod members extending between the sets of vertical members define shelves. Three shelves designated 42, 44 and 46 are illustrated. Each of the shelves is preferably defined by a horizontally disposed layer of rigid wire mesh 48 overlying associated rod members. A front wall 50 and a rear wall 52 may be provided using similar wire mesh. The use of wire mesh walls minimizes air resistance and reduces weight.

Each of the shelves is provided with at least one divider and preferably with a plurality of such dividers. In FIG. 1, there is illustrated dividers 54, 56 and 58. The dividers are identical. Hence, only divider 58 will be described in detail.

The divider 58 is defined by a pair of upright side walls 60, 62. The side walls are provided with large holes 64 so as to minnimize air resistance and weight. The upright edges at each end of each of the walls is folded back on itself to provide rigidity and minimize the possibility of inadvertently scratching or cutting an operator. The divider is open at the top and open at each end as well as being open at its bottom.

The sole means interconnecting the walls 60 and 62 is a pair of puller members 66, 68 which act as a handle. Each puller member is disposed at one end of its associated divider at an elevation slightly below the elevation of its associated shelf. Thus, the distance between the puller members 66, 68 is slightly greater than the width of the shelf across the sides of the vehicle. Thus, the uppermost surface on the puller members 66, 68 is substantially tangent with or on the same plane as the lower edges of the side walls 60, 62.

Figure 3:
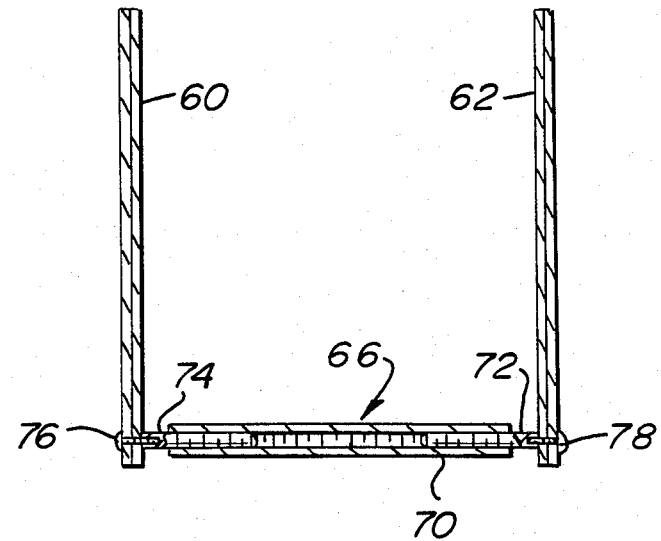
FIG. 3 is a sectional view taken along the line 3—3 in FIG. 2 but on an enlarged scale.

The puller members 66, 68 may assume a variety of shapes. The preferred construction is shown in detail in FIG. 3 wherein puller member 66 includes a hollow sleeve 70 which is threaded on its inner surface. Threaded members 72 and 74 are adjustable with respect to the sleeve 70 and project therebeyond. Each of the threaded members 72, 74 is connected to one of the side walls by one of the fasteners 76, 78. When constructed in this manner, the distance between the walls 60, 62 may be adjusted while at the same time there is provided a rigid interconnection between the side walls 60, 62.

Figure 2:
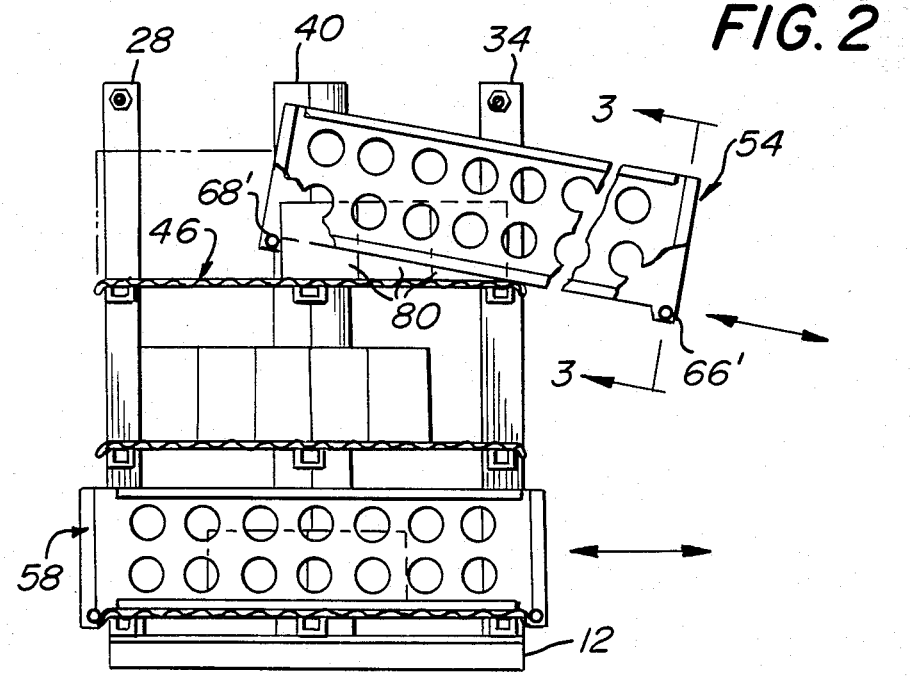
FIG. 2 is a sectional view taken along the line 2—2 in FIG. 1.

Referring to FIG. 2, merchandise 80 which is on the top shelf 46 remote from the side where the operator is standing is difficult to reach. The operator need merely grasp the puller member 66' on the divider 54 and pull the same toward him, that is from left to right in FIG. 2. The puller member 68' will be elevated and will push all merchandise toward the right side of the vehicle as the divider 54 is pulled by the operator. Thereafter, the divider 54 is returned to the position shown in FIG. 1. At the same time, the merchandise 80 will have been moved sufficiently forward so that the operator may reach the same. The use of a mesh wire shelf minimizes friction between the shelf and the merchandise 80. The vehicle 10 may be constructed in a conventional manner whereby it is easily stopped or disconnected from its propelling drive means while the operator is removing merchandise from the vehicle. The vehicle 10 need not be of the type illustrated wherein a drive wheel is utilized but instead the vehicle may have a tow pin at the front end thereof for contact with a floor mounted conveyor chain. The divider and/or lane puller may be utilized on other types of vehicles and in other environments.

Figure 4:
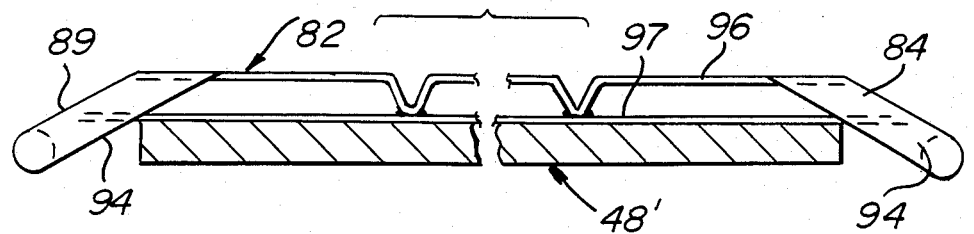
FIG. 4 is a sectional view through a shelf and showing a divider in accordance with another embodiment.
Figure 5:
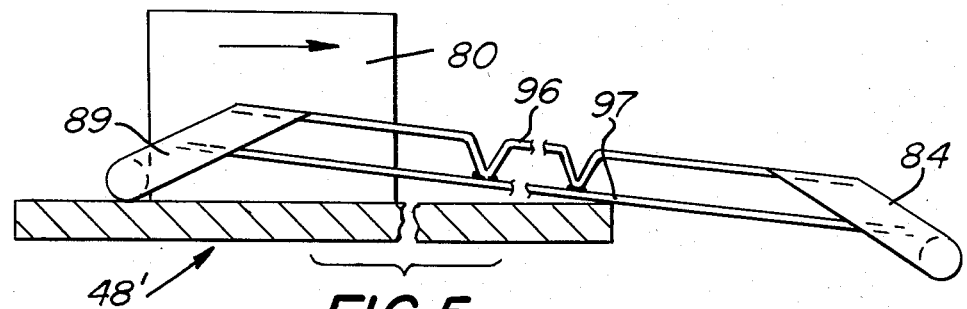
FIG. 5 is a view similar to FIG. 4 but showing the divider in a different position.
Figure 6:
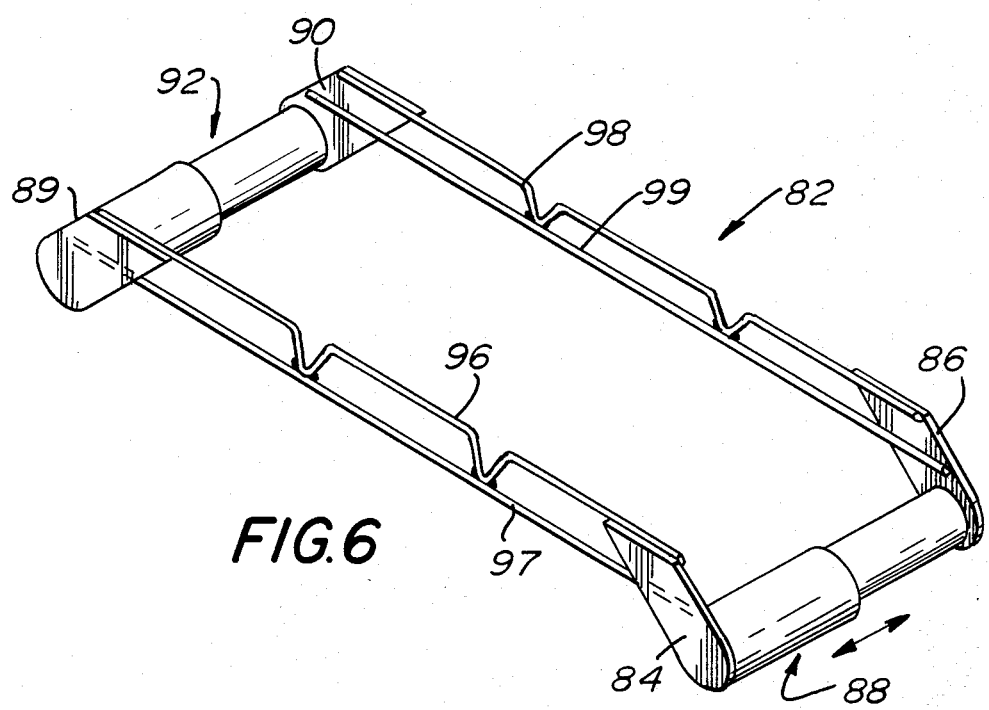
FIG. 6 is a perspective view of the divider shown in FIG. 4.

In FIGS. 4–6 there is shown another embodiment of the divider/puller which is designated 82 and associated with a shelf 48'. Divider/puller 82 is designed to be a shelf divider and puller in the same manner as divider 54 but is lower in height and simpler.

Divider 82 has a pair of inclined side frame members 84, 86 interconnected at their lower end by a telescoping handle 88. Divider 82 also includes a pair of inclined side frame members 89, 90 interconnected at their lower ends by a telescoping handle 92. The members 84, 86, 89, 90 converge upwardly so as to have a cam surfaces 94 on their lower surface for cooperation with the edges of the shelf. Struts 96, 97, 98, 99 are secured to and interconnect the frame members as shown. Struts 96 and 98 have V-shaped portions welded to the strut therebelow for increased rigidity while at the same time said portion can be used as a guide to indicate the need to replenish goods in that lane. Divider 82 is bottomless and the handles are below the elevation of the shelf 48' as shown in FIG. 4 so that merchandise 80 immediately adjacent the front edge of the shelf 48' may be removed (or during replenishment) without contacting the handle. As shown in FIG. 4, strut 97 (and also strut 99) rest on the upper surface of shelf 48'.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus in of the type disclosed wherein there is provided a plurality of shelves disposed one above the other and on which merchandise may be stacked, at least one divider trough supported by each shelf and moveable with respect to its associated shelf, each trough being open at the top and bottom and being open at each end thereof, a discrete puller member extending between side walls of the trough at each end thereof to facilitate pulling of the trough and any merchandise therebetween toward one side to facilitate access to the last mentioned merchandise, at least one of said puller members being below the top surface of its associated shelf.

2. A driverless vehicle having support wheels, means on said vehicle for contact with a means for propelling said vehicle, a plurality of shelves on said vehicle and said shelves being open at at least one side of the vehicle, the improvement comprising at least one divider trough supported by said shelves and separate therefrom, each trough being open at the top and bottom and open at each end, a discrete puller member extending between side walls of the trough at each end thereof to facilitate pulling the trough and any merchandise therebetween toward said one side to facilitate unloading the vehicle.

3. A vehicle in accordance with claim 2 wherein the puller member is adjacent the bottom ends of said troughs below the elevation of the top surface of the associated shelf.

4. Apparatus in accordance with claim 3 wherein said puller members are adjustable so as to facilitate increasing the distance between side walls of the trough.

5. A vehicle in accordance with claim 3 wherein the shelves are wire mesh, each trough having upright side walls defined by perforated sheet metal.

6. A vehicle in accordance with claim 2 wherein said troughs include perforated upright side walls and the puller members are at the lower ends of the side walls, with the distance between the puller members on one trough being slightly greater than the corresponding length of the shelf on which the trough is mounted.

7. A vehicle in accordance with claim 2 wherein each trough is substantially narrower than its associated shelf so that a plurality of such troughs may be provided on each shelf, said vehicle having a front end and a rear end and being adapted for movement in a predetermined direction, said shelves being transverse with respect to said direction.

8. An article of manufacture comprising a bottomless trough adapted for use as a shelf divider and merchandise puller, said trough being topless and having opposite upright sides connected at each end only by a transverse handle adjacent the lower ends of the sides, the ends of the sides including upwardly converging cam surfaces for contact with an end of a shelf, said sides having a lower end portion for resting on a shelf, said handles being below the elevation of said edge portions.

* * * * *